Aug. 19, 1952     A. R. FULTZ ET AL     2,607,267
OPTICAL SYSTEM FOR THE INSPECTION OF CURVED PROFILES
Filed March 29, 1950     8 Sheets-Sheet 1

ALLEN R. FULTZ
ROBERT J. HUDAK
INVENTORS

BY *Daniel J. Mayne*
*F. M. Emerson Holmes*
ATTORNEYS

Aug. 19, 1952 A. R. FULTZ ET AL 2,607,267
OPTICAL SYSTEM FOR THE INSPECTION OF CURVED PROFILES
Filed March 29, 1950 8 Sheets-Sheet 2

ALLEN R. FULTZ
ROBERT J. HUDAK
INVENTORS

BY Daniel J. Mayne
F. M. Emerson Holmes
ATTORNEYS

Aug. 19, 1952  A. R. FULTZ ET AL  2,607,267
OPTICAL SYSTEM FOR THE INSPECTION OF CURVED PROFILES
Filed March 29, 1950  8 Sheets-Sheet 5

ALLEN R. FULTZ
ROBERT J. HUDAK
INVENTORS

FIG. 12.

Aug. 19, 1952 A. R. FULTZ ET AL 2,607,267
OPTICAL SYSTEM FOR THE INSPECTION OF CURVED PROFILES
Filed March 29, 1950 8 Sheets-Sheet 8

FIG. 13.

ALLEN R. FULTZ
ROBERT J. HUDAK
INVENTORS

BY Daniel I. Mayne
F M Emerson Holmes
ATTORNEYS

Patented Aug. 19, 1952

2,607,267

UNITED STATES PATENT OFFICE 2,607,267

OPTICAL SYSTEM FOR THE INSPECTION OF CURVED PROFILES

Allen R. Fultz and Robert J. Hudak, Rochester, N. Y., assignors to Eastman Kodak Company, Rochester, N. Y., a corporation of New Jersey Application March 29, 1950, Serial No. 152,546

18 Claims. (Cl. 88—24)

This invention relates to contour projectors such as used in machine shops for the inspection of machine parts.

It is the object of the present invention to provide an optical system for the examination of the complete profile of a cross section of a test object. It is also a primary object to permit such inspection of profiles which cannot be viewed orthogonally. Most profiles must be viewed obliquely if the object itself is to remain in one piece.

It is an object of certain embodiments of the invention to examine the complete profiles of two cross sections of a single object and to compare them one with the other. In this connection, it is the object of the invention to project images of two complete profiles superimposed on a viewing screen.

It is an object of a preferred embodiment of the invention to illuminate the complete profile which is to be inspected by means of two illuminating systems only. Complete illumination from all sides, i. e. covering 360° can, in most cases, easily be obtained with illumination from three or more directions, but according to this preferred embodiment of the invention, only two illuminating systems are used, and these are located on opposite sides of the object.

It is a further object of the invention to project the images from the cross section under test in such a manner that the main advantages of the Turner and Kingslake projection system described in copending application Serial Number 64,404 filed December 9, 1948, now Patent No. 2,552,238 of May 8, 1951, are obtained in the present instrument. These advantages include a large working space to accommodate various objects under test and a choice of magnifications for viewing of the image without affecting the working space. In this connection it is a special object of one embodiment of the present invention to arrange the projection lenses of the optical system, as required for the advantages just mentioned, in a convenient combination with the reflectors which are essential to the present invention for obtaining the complete profile in a single image. Incidentally the present invention is the first application of the Turner and Kingslake system to oblique inspection.

In connection with the embodiment of the invention which permits the simultaneous, or rapidly successive, inspection of two different sections, one preferred feature or group of features permits these sections to be either very far apart or very close together. The illumination of two sections close together by separate optical systems would normally involve mechanical interference of the illuminating systems, but the preferred feature here referred to eliminates this interference without spoiling the effectiveness of the illuminating systems.

According to the invention the above objects are obtained by an optical system which includes a plurality of illuminators for illuminating a line around the object under test. That is the profile of the section is illuminated by a line of light. This may be done by merely shining light through a slit so that the shadow of the mask in which the slit is formed defines the line of light, but preferably images of illuminated slits are formed on the object. A plurality of objectives are also uniformly spaced around the object to receive the light obliquely reflected from the line of illumination. The objectives are all substantially at the same obliquity and form images of the parts of the line "seen" by the objectives. According to the invention a pair of mirrors is optically aligned with each of the objectives for reflecting the images into register and for making these aerial images parallel to the original section of the object which is illuminated. Furthermore, the images of this profile are perpendicularly spaced from the section which they represent.

If the object under test is considered to have an axis perpendicular to the section being examined, the images are in register on this axis or around the axis and are also in a plane perpendicular to this axis.

Preferably the aerial images thus registered are relayed by a projection lens which receives light from the images and forms a magnified image thereof on a screen for convenient viewing. Preferably the objectives which receive light from the profile under test and form the first aerial image are afocal objectives consisting of two positive lenses (usually but not necessarily of equal power) separated by the sum of their focal lengths. For the sake of compactness, at least one of the mirrors associated with each objective is optically between the two positive lenses which make up the objective in this afocal case.

Preferably there are only two illuminating systems for each section and they are located on opposite sides of the object. The oblique projection systems include two objectives on the same opposite sides of the object as the illuminating systems, for receiving the obliquely reflected light. If the illuminating systems form a beam of light diverging toward the object, the edges will not be illuminated, but when each of the illuminating systems includes positive lenses wider than the object and arranged to form converging beams of light on the opposite sides of the object, these beams overlap each other around the edges of the object so that a complete profile is illuminated. The last lens of the illuminating system is said to "see over-the-hill" with respect to the object in this case; the lens "sees" around both sides of the object. To insure a definite line of light accurately defining the profile in question, the preferred embodiment of the invention employs illuminating systems including an illuminated slit in each case and an objective for forming an image of the slit on the object. To provide sharp edges to the line of light on the profile, the illuminated slit is approximately, and preferably precisely, conjugate to the part of the object which is illuminated thereby.

Preferably, the illuminating system, as well as the objective system includes an afocal objective consisting of two positive lenses separated by the sum of their focal lengths. In this case, the conjugate relationship between the slit and the object is obtained by using a slit which is approximately, preferably exactly, the same shape as the side of the object which it is illuminating. Various methods of forming such slits may be used. Extremely precise work for example, employs a sheet of glass molded on the object itself and then provided with a black coating in which a slit is engraved or etched.

In order to permit the simultaneous viewing of the images of the profiles of two different sections of the object, specifically two parallel sections of the object, the present invention provides a duplicate set of illuminating systems. The image of the first profile is projected as described above, but a plane reflector is located in the beam parallel to the section so that the light from the second illuminated profile, reflected obliquely by the second section, is reflected by the mirror into alignment with the direction of the beam of light from the first section. To obtain this effect, the mirror is parallel to both sections or profiles and is located half-way between them. In one embodiment, this mirror is semi-transparent so that images of both sections are formed simultaneously. In another embodiment, the mirror is fully reflecting and is mounted to be quickly moved in and out of place for viewing the images of the two sections in rapid succession. Images of the two profiles are thus superimposed or effectively superimposed and the axis of the object as discussed above in connection with this optical system is, by the nature of the optical system, superimposed for the two images. Manipulation of the object itself will move one of the images relative to the other until this axis corresponds to some desired axis in the object.

For example, in the construction of turbine blades it is desirable to know the exact location of the axis thereof defined by the line which passes through the "center of gravity" of the blade sections. This line may or may not be straight, depending on the shape of the blade, but for the purposes of the present example, it is assumed that the operator is interested in the location of the axis is a turbine blade which has such an axis straight. The operator places the turbine blade in the present instrument and then recognizing the center of gravity of the cross sections, or more exactly of the images thereof, he manipulates the turbine blade until these two sections are registered in the images. He then knows that the axis of the object which he is seeking is on the axis of symmetry of the instrument.

In testing certain objects, it is desirable to compare profiles of sections which are quite close together. The distance between the sections under examination may be varied merely by moving the illuminating systems toward or away from each other while maintaining the semitransparent mirror half-way between the planes defined by the illuminating systems. However, when the sections are very close together, there is mechanical interference between the optical systems which constitute the illuminating means. To overcome this, a preferred embodiment of the invention employs four illuminating systems including lenses of semi-circular profile with the flat side of the lenses in the systems on each side of the object facing toward each other. When such illuminating systems are moved toward each other, there is a minimum of mechanical interference. At the same time the effective diameter of the last lens of each illuminating system is not reduced as far as the ability of this lens to see "over the hill," i. e. around the edges of the object, all as discussed above. When each of the illuminating systems consists of an afocal lens, only the second positive lens in each case has to have this semi-circular profile. A mirror may be included between the second and the first lenses of the afocal system so that the first lens may be to one side for one of the profiles and to the other side or, even to the same side but longitudinally displaced, with respect to the other profile so that there is no interference of these first lenses when the illuminating systems are moved toward each other.

The operation of the invention and other objects and advantages thereof will be fully understood from the following description when read in connection with the accompanying drawings in which.

Figure 1:
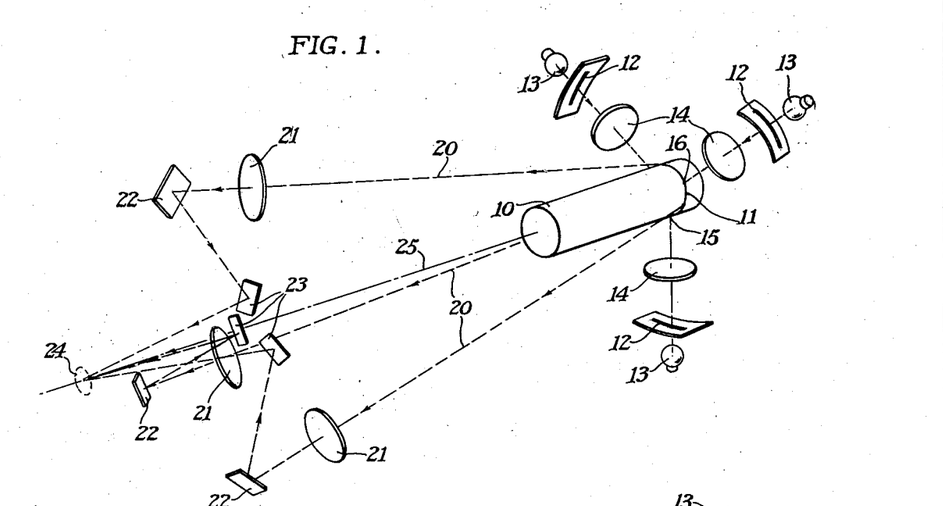
Fig. 1 is a perspective schematic view of one embodiment of the invention.
Figure 2:
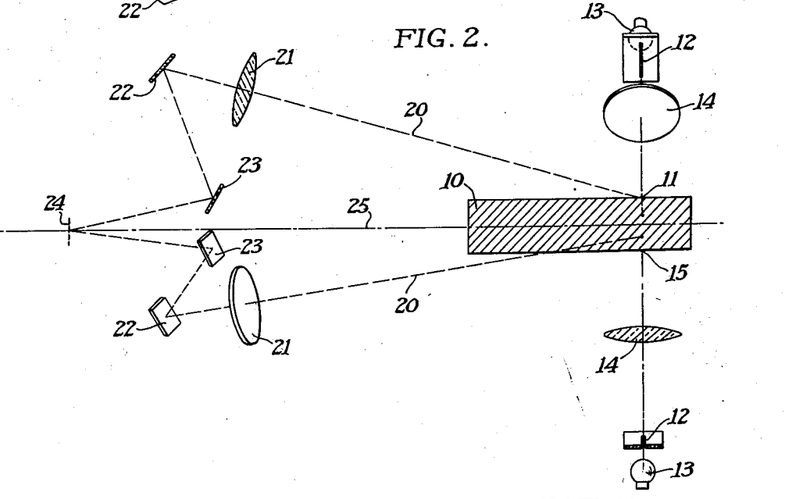
Fig. 2 is a vertical section of the embodiment shown in Fig. 1.

In Figs. 1 and 2 the object to be examined is shown as a cylinder 10. A line of light 11 around this object 10 at one plane section thereof and constituting the profile at this section, is produced by slits 12, illuminated by lamps 13, so that images of these slits focused by objectives 14 onto the object form the required line of light 11. For the sake of generality the optic axes of the lenses 14 impinge on the object 10 at points 15 and 16 which are different from the axes of the objectives which are to form images of the profile in question. Preferably the slits 12 are curved, as shown, conjugate to the part of the object 10 which they are to illuminate.

Three beams of light represented by rays 20, obliquely reflected from the object, are focused respectively by three lenses 21 and a pair of mirrors 22 and 23 associated with each lens, to form images 24 in register in a plane parallel to the section 11 and perpendicularly spaced therefrom. The object 10 is normally a diffuse object so that light from the line 11 goes out in all directions. Since most objects have some specular reflection in addition to their diffuse reflection, a maximum brightness is obtained by insuring that a maximum amount of light from the lenses 14 strikes the line 11 obliquely from the side opposite to that in which the rays 20 leave the line 11. This is important later in connection with the embodiment of the invention which uses half lenses or lenses of semi-circular profile. If the lenses 14 are cut down the middle and only one half thereof is used, it is better to have it on the "far" side of the line 11 so that a maximum amount of light is traveling in the direction of the rays 20. This is exactly what happens in the semi-circular lens case discussed below, which is fortunate.

It will be noted that the image 24 is in a plane orthogonal to the axis 25 of the object 10. Of course, the object 10 may not be a symmetrical one, or may not be oriented orthogonal to the section 11, but the axis 25 in question is one perpendicular to the section 11 and in every case, the image 24 is in a plane parallel to the section 11.

The use of three illuminating systems and three objective systems insures that the whole profile is examined, except possibly for some very unusual object, but the tripling of the number of optical systems is quite expensive and the mounting thereof spaced at 120° is not too convenient and therefore it would be preferable to use only two illuminating systems and two objectives. Such an arrangement requires a special form of illuminating system if the profile image is to be uniformly bright. The reason for this is illustrated in Figs. 3 and 4.

Figures 3, 4, 5:
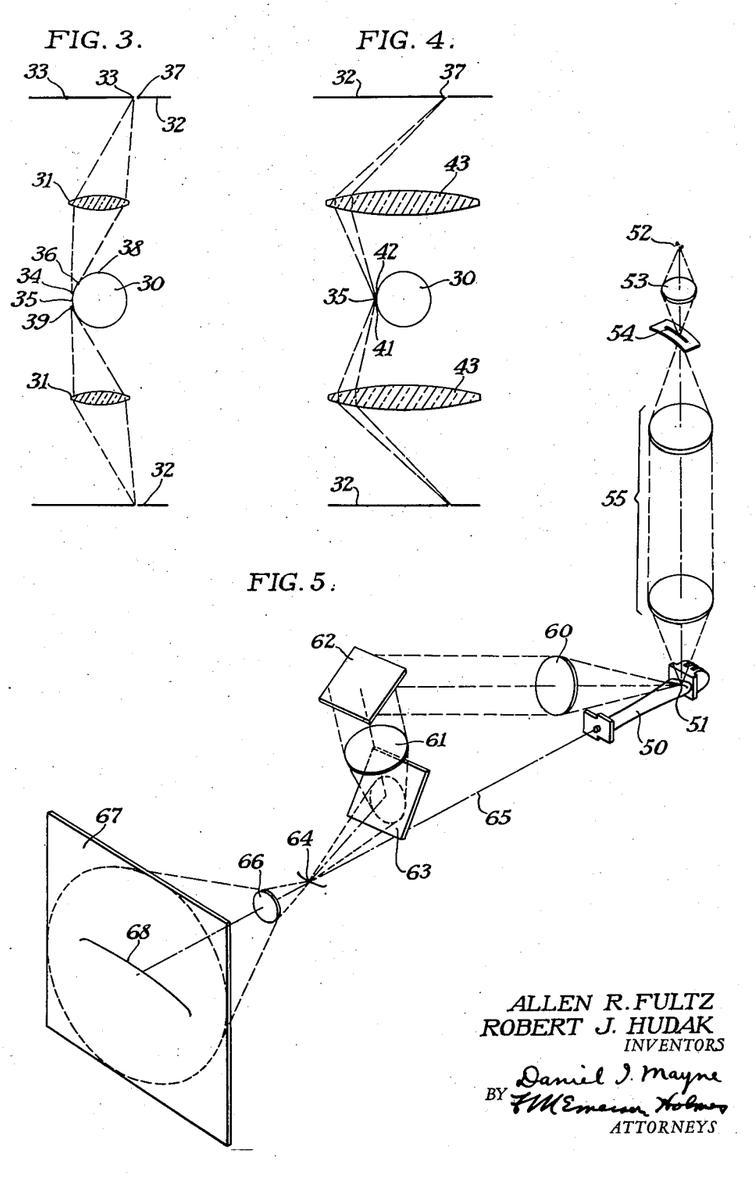
Figs. 3 and 4 are schematic showings of optical systems to illustrate the principle of "over the hill" illumination.
Fig. 5 is a schematic perspective view of one part of the optical system of a preferred embodiment of the invention.

In Fig. 3 the object 30 is illuminated by elongated light sources or slits 32 focused by lenses 31 whose aperture or diameter is not appreciably greater than that of the object 30. It does not matter how long the light source or secondary light source 32 is. The only light which strikes the object 30 is that from between the two points 33 for example. Light from the point 33 reaches the point 34 on the object 30 through one side of the lens but does not reach even this point via the other side of the lens. All of the points of the object 30 between the point 36 and the point 38 are fully illuminated but the intensity of illumination falls off between the points 36 and 34 and there is no illumination beyond the point 34 from the upper illuminating system. Similarly there is no illumination beyond the point 39 from the lower illuminating system, and thus all points between 34 and 39, such as the point 35, are not illuminated at all. The point 37 could illuminate beyond the point 34 if it were not for the shadow of the object 30 itself. In Fig. 4 the only difference is the substitution of lenses 43 which have a larger aperture. The fact that the diameter of the lenses 43 is greater than that of the object 30 allows the lenses to see "over the hill." Light from the point 37 in this case actually reaches the point 41 and similarly light from the lower slit 32 can reach the point 42. The point 35 on the object 30 is illuminated by both illuminating systems. Thus by the simple expedient of using large aperture lenses, complete illumination of the profile is obtained with only two illuminating systems. It should be noted that the diameter of the lenses 43 in the direction parallel to the profile under question is the effective diameter. The lenses 43 may be cut in half the other way or the other diameter thereof may be reduced in any desired manner without affecting the ability of the lenses to see "over the hill" for the above discussed purpose.

Figures 6, 7:
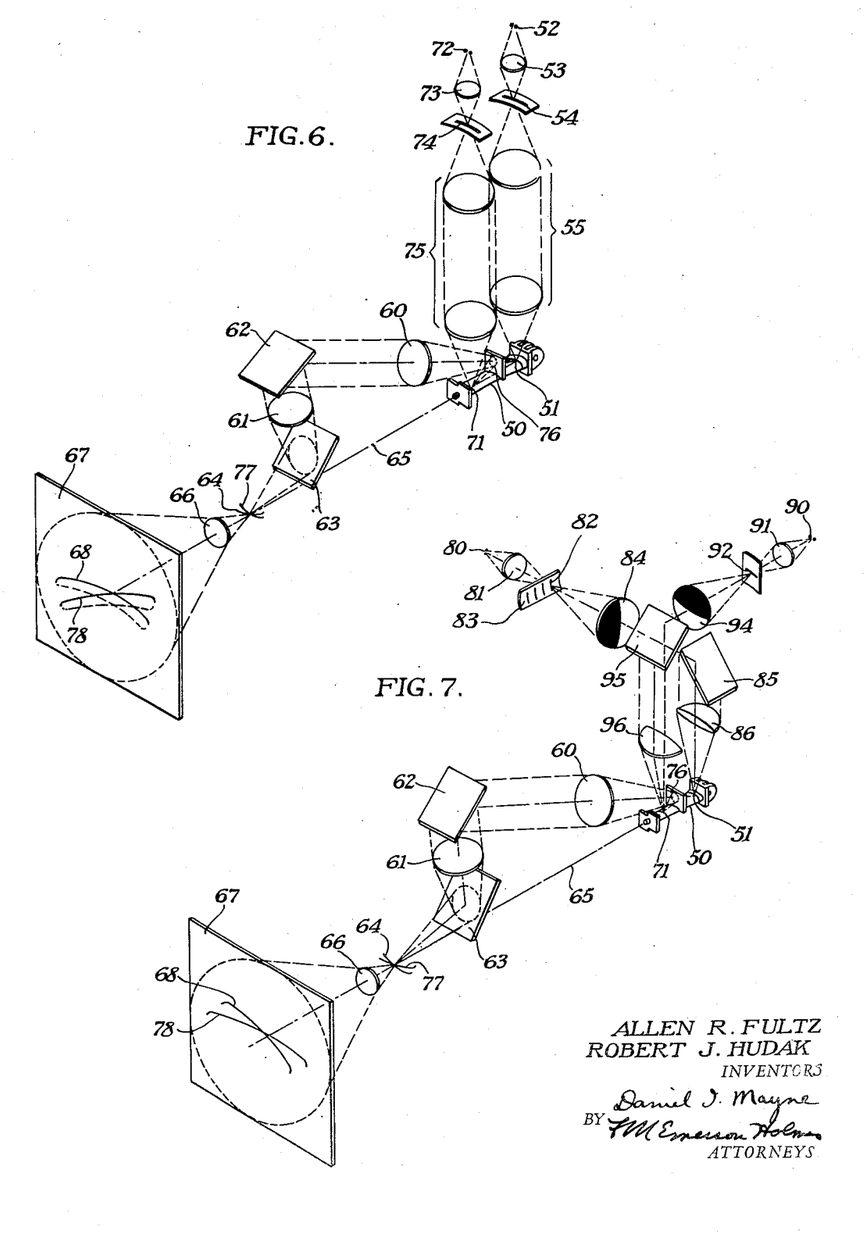
Fig. 6 is a similar view illustrating the addition of the two-section feature.
Fig. 7 is a similar view illustrating the addition of the semi-circular lens feature.

The preferred embodiment of the invention will now be described in detail. The invention refers only to the optical system. The mechanical means for holding the object under test and for manipulating it are shown only schematically since they are not an essential part of the present invention. Further to simplify the explanation of the optical system, schematic Figures 5, 6 and 7 are included, in which the component parts of each lens and the mount for each lens is omitted. Furthermore, the discussion is confined to the system on one side of the object, it being understood that there is an identical optical system on the opposite side of the object in each case. The entire profile of a section is projected by matching the half profiles seen in the Figs. 5, 6 and 7.

In Fig. 5 a turbine blade 50 is positioned and held so that a section 51 is illuminated and examined by the instrument. Light from a lamp 52 through a condenser 53 uniformly illuminates a slit 54 which is curved to match approximately the section 51. An image of this slit 54 is projected by an afocal lens 55 onto the section 51 and fits closely to this section. Light from the section 51 is projected obliquely by an afocal lens made up of positive lenses 60 and 61 separated optically by the sum of their focal lengths. Mirrors 62 and 63 are included in this image forming system to place the image 64 in a plane parallel to and perpendicularly spaced from the section 51.

To avoid designating the same line on the drawing by three different numbers, 51 refers to the section, secondly to the profile of the section and thirdly to the line of light on this profile. The axis 65 is perpendicular to the section 51 and to the plane of the image 64. A second objective 66 receives light from the image 64 and projects it to a screen 67 forming a greatly enlarged image 68 thereon.

The following discussion will begin with the light source and explain the function of each element of the system.

*Light source.*—The most desirable and optically efficient light source is a single long source of small cross-section. The capillary of the mercury lamp is of small cross-section and can be obtained in sufficient length for this application. Furthermore, there is no sagging or other displacement of the luminous mercury column with reference to the optical system as would be encountered in using a tungsten filament. The form of the light source is not a critical part of the present invention.

*Condensing lens.*—A condensing lens of large diameter or aperture collects as much of the total light emitted by the source as practical and concentrates it through a narrow slit cut in a metal ribbon or scribed in an aluminized glass plate, so as to fill the afocal lens 55. A second function of the condensing lens is to concentrate all of the light source on the slit. The illuminated mercury column is of a fixed length; in one type of lamp commercially available it is three inches long. On the other hand, the slit is preferably as long as the chord of the section being projected when conjugate thereto with respect to a lens 55 working at unit magnification. A turret of condenser lenses may be used for special purposes, but this is not usually necessary.

*Slit.*—The slit serves the purpose of baffling all of the light coming from the source through the condensing lens except a narrow band which is projected to the blade by the primary relay lens system. The slit performs two functions. First, the edges of the slit sharply define the boundaries of the band of light falling on the blade. One of these boundaries in turn defines the profile of the blade on the screen, as will become more apparent later. Second, by curving the slit to the approximate profile of the blade section, the light from it can be projected to the blade without encountering depth of focus difficulties in the primary relay lens. If a straight slit were used at all times, then the primary relay lens which projects it would have to be stopped down or, in other words, its aperture reduced, until the lens had sufficient depth of focus to project the straight slit on a curved blade and still maintain the proper focus at the blade. However, reducing the aperture of the lens reduces the light that can pass through it as the square of its diameter, so that such an arrangement is totally unsatisfactory if the blade has any appreciable curvature. An example will make this point more apparent. The primary relay lenses as designed for this machine have an aperture of F/2.1. At this aperture they will tolerate a depth of focus variation between the object and the image of only about .040 inch. If a variation between the shapes of the slit and the blade of ½ inch were desired, the lens would have to be stopped down to an aperture of F/22, and at this reduced aperture the light passing through the lens would be decreased to .009 of its former value.

*Primary relay lens 55.*—As mentioned above, the relay lens 55 projects the band of light coming from the slit to the corresponding section of the blade. The primary relay lens is actually two independent lenses of equal power separated by twice the focal length of either. This system has the advantage over a single lens of working at a much higher aperture and has no distortion. The system has sufficient back focus so that interference of the lens mounts with other optical beams or with the blade is avoided.

*Secondary relay lens (60 and 61).*—The secondary relay lens, consisting of lenses 60 and 61, views the light band on the blade and transfers an image of it to a new position 64 on the axis 65 at any desired magnification (1:1 in the example shown). This transfer is accomplished by the lens elements themselves, while the orientation on the axis 65 is done by two mirrors 62, 63 built into the relay system. The reason for using a secondary relay lens is first, that it is not practical to design a 10 or 20 power projection lens having sufficient back focus to view section A and still clear the end of a 9 inch long blade for example, unless a great deal of variation could be tolerated in the position of the screen for various magnifications; second, this necessary clearance would require a 10X lens of almost prohibitively large diameter. Consequently, the relay lens places the image of the section in a position which is unobstructed by the blade itself, so that this image can be viewed by a projection lens of any power. In fact, in setting up the machine this "first image" 64 is critically examined using a microscope in order to check the alignment of the various mirrors. The relaying of this image by lens 66 to screen 67 is not an essential feature of the invention but merely provides convenient viewing of the images.

The secondary relay lens (60 and 61) views the light band at section 51 at an angle of 25 degrees with the axis 65. This angle has been arbitrarily chosen.

*Projection lens.*—As the name indicates, the projection lens 66 views the first image and projects it at a specified magnification on a screen which in this embodiment is translucent but of course could be reflecting. Since there are no restrictions on the back focus of the projection lens, one can be designed for any magnification as long as the practical limitations imposed by the screen size and the amount of light available are met. Magnification changes are easily made by mounting various projection lenses in a turret and indexing to whatever magnification is desired.

*Screen.*—Either an opaque or a translucent screen 67 could be used, but the opaque screen has the disadvantage of forcing the observer to assume a position which interferes with the light striking the screen, so that a translucent screen is more practical. Ordinary ground glass is a satisfactory screen material.

Fig. 6 is similar to Fig. 5 in all respects except for the addition of a mirror 76 and a second illuminating system for illuminating another section 71 of the turbine blade 50. As in Fig. 5, only the upper half of the system is shown and considered here. A duplicate system illuminates the lower side of the section 71. Elements 72, 73, 74 and 75 correspond exactly to elements 52 to 55. Light from the profile 71 is received by a semi-transparent mirror 76 which reflects this light into alignment with the beam from the section 51, which in this case is transmitted by the mirror 76. Thus a second image 77 is superimposed on the image 64 and both of these images are projected by the lens 66 to the screen 67. The images 68 and 78 thus formed are superimposed and a certain point in each profile falls on the center of the screen corresponding to the axis 65. In Fig. 6, dotted lines have been provided to show the complete images 68 and 78. The lower half of each image, i. e. the part shown by broken lines, is produced by the corresponding optical systems (not shown) below the axis 65. By manipulating the blade 50, the images 68 and 78 may be moved on the screen until the center of gravity of both sections are superimposed on the center point which corresponds to the axis 65.

It is noted that the lens 60 can "see through" the half-silvered mirror 76 to receive light from section 51. At the same time a portion of the light from section 71 strikes the half-silvered mirror 76 and part of it is reflected to the lens 60 along the same path as followed by the light from section 51. The remainder of the light from section 71 which strikes the mirror 76 passes through and is lost. The mirror 76 is equi-distant from sections 51 and 71 and hence the path lengths from section 51 to the mirror and section 71 to the mirror are equal. Thus both sections 71 and 51 are brought into proper focus and projected simultaneously. To eliminate any error due to the thickness of glass carrying the half-silvered mirror, which would introduce a slight difference in the optical path length, the mirror is kept as thin as possible. Pellicles are usually used for this purpose. A full silvered mirror at 76 reflects the section 71 and forms images 77 and 78 only. In this case, the mirror is mounted to be moved out of the way for examination of images 64 and 68 of section 51. While this alternative embodiment means that the images are not projected simultaneously, nevertheless rapid movement of the mirror 76 back and forth in and out of the position shown is in practice quite satisfactory and there is little objection to the fact that one sees only one image at a time. The use of a full silvered mirror doubles, in fact more than doubles, the brightness of the images as compared to a semi-transparent, semi-reflecting mirror. Thus both arrangements have advantages.

In Fig. 6 the section 71 may be at any distance from the section 51 provided the mirror or semi-transparent mirror 76 is half-way between the sections and secondly provided that the lenses 55 and 75 do not interfere with each other mechanically. The purpose of the arrangement shown in Fig. 7 is to overcome this second limitation and to permit the sections 51 and 71 to be selected very close together.

In Fig. 7 the section 51 is illuminated by light from a lamp 80 through a condenser 81 and a curved slit 83 matching the section 51. As different sections of the blade are selected, different slit curvatures are required for absolutely precise illumination. Therefore a turret 82 of slits is provided and different slits are moved into the light beam as different sections of the blade are selected for illumination. It will be realized that when this instrument is used for testing blades made in mass production, the slits are selected to match the correct or "perfect" blade and discrepancies between blades will in general not be great enough to warrant changing the shape of the illuminating slit although of course the profile seen on the screen 67 may be distinctly different and may in some cases fall outside of tolerance limits.

Light from this slit 83 is projected by an afocal lens system consisting of two positive lenses 84 and 86 separated by the sum of their focal lengths to form the line image 51. The lens 84 may be a full lens or only half of a lens without the section which is blacked out in the drawing. However, according to the special feature of this embodiment of the invention the lens 86 is only a half lens, i. e. one with semi-circular profile with the flat side facing toward the other illuminating system. A mirror 85 reflects the light from lens 84 to the lens 86.

The section 71 is similarly illuminated by a lamp 90, a condenser lens 91, a slit 92 and an afocal lens made up of positive lenses 94 and 96 with a mirror 95 between them. In this case the lens 94 may be, and the lens 96 must be, a half lens of semicircular profile. The light beam for this second system passes above the beam for the first system before reflection by the mirror 95. The mirrors 85 and 95 may be oriented in various directions and may even be oriented in the same direction providing one is in a higher plane than the other. It will be seen that as the illuminating systems are moved toward each other, mechanical interference is reduced to a minimum and the sections 51 and 71 may be selected quite close together.

Figs. 8 to 14 illustrate a preferred embodiment of the invention incorporating all of the features discussed above. The mirror 76 is shown as a semi-transparent pellicle rather than a full silvered mirror mounted on a turret to be moved in and out of place, but both arrangements are useful, as has been mentioned. Since the present invention relates to the optical system, these drawings illustrate the details of the optical system and the mounts therefor but do not bother to go into great detail with respect to the mechanical system for manipulating the workpiece under examination. As far as the present invention is concerned, any mechanical system is satisfactory for this purpose.

In all of these figures, the reference numerals are the same as those used in Fig. 7 where corresponding parts are shown and the duplicate system which illuminates and projects the image of the lower side of each section uses the corresponding numeral added to 100. For example, the light source 90 corresponds to the lower light source 190 and the slit 92 corresponds to the lower slit 192.

Figures 8, 14:
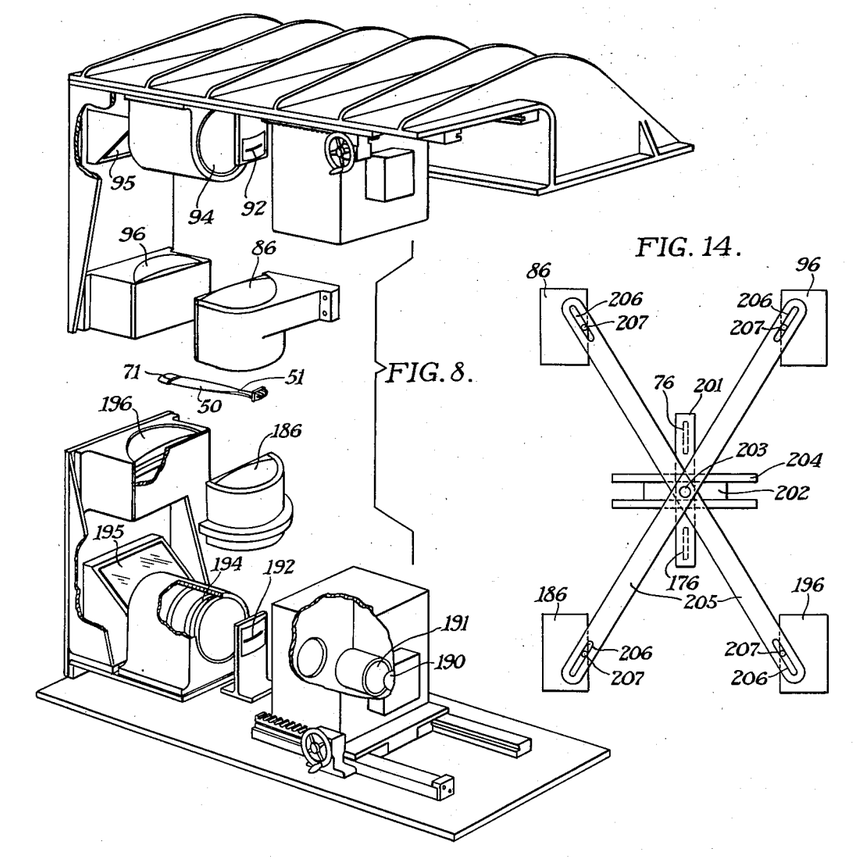
Fig. 8 is a perspective view of part of the illuminating system and its mount in the preferred embodiment of the invention.
Fig. 14 is a rear view of one detail (the mirror mount) of the instrument.

Fig. 8 shows the upper and lower optical systems for illuminating the section 71 on the turbine blade 50. The "last" lenses 86 and 186 of the system which illuminates section 51 are also shown in Fig. 8 but the rest of these systems are omitted from this particular figure. It will be noted that the whole optical system is longitudinally movable on tracks to permit the selection of different sections 71 of the blade 50. Either mechanical or electrical driving mechanisms can be used for this purpose. This is not an essential feature of the invention and in the arrangements shown, simple turn wheels engaging pinions riding in racks provide the necessary motion.

Figure 9:
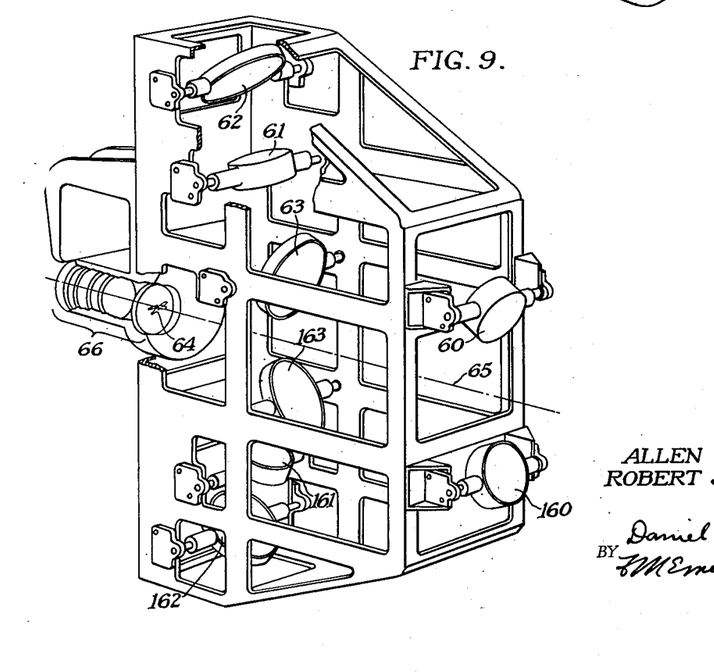
Fig. 9 is a similar view of the objective system employed in the invention.

Fig. 9 illustrates the preferred mount for the afocal projection lens made up of lenses 60 and 61 and mirrors 62 and 63, and their corresponding counter parts 160 to 163 below the axis 65. It will be noted that the lenses 60 and 61 and the mirrors 62 and 63 are mounted rotatable and they are adjusted to insure that the image 64 is not only on the axis 65 but is in a plane orthogonal to the axis 65. The projection lens 66, including a field lens near the image 64, is also shown in this Fig. 9.

Figure 10:
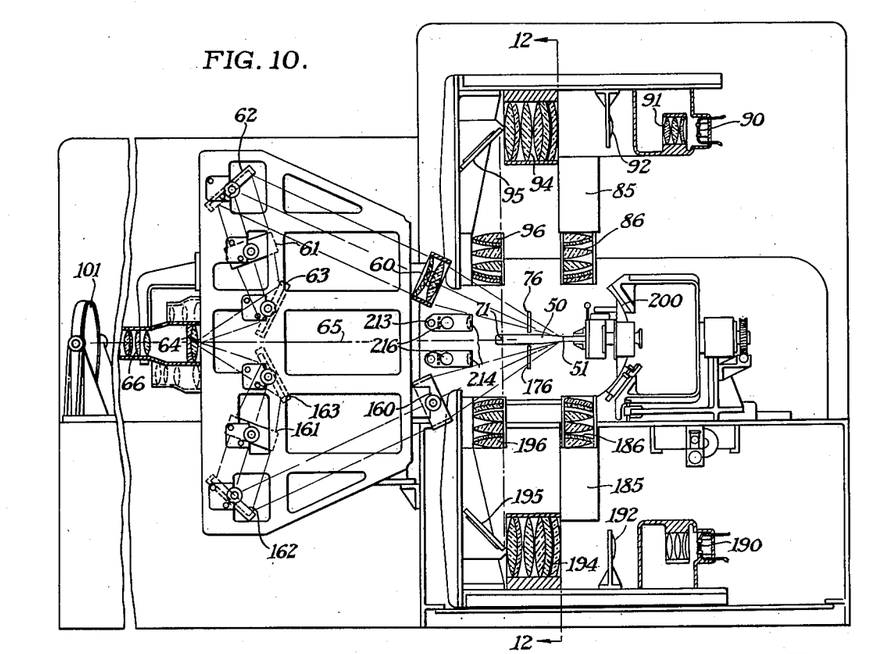
Fig. 10 is a vertical section through the optic axis of this preferred embodiment with certain of the mounting features shown but in minimum detail to avoid confusion.

All of these parts also appear in the vertical section which constitutes Fig. 10. The lower semitransparent mirror 176 is shown in this figure. It will be noted that the blade 50 is mounted in a chuck or clamp which can be moved longitudinally of the axis 65, secondly which can be rotated about this axis and thirdly can be rotated about axes at right angles to the axis 65 at the center of curvature of a spherical bearing 200 which constitutes part of the clamping mechanism. This center of curvature is in the plane or section 51; thus rotation of a test blade 50 to adjust the section 71 does not affect the adjustment of the first section 51. The clamping and manipulating mechanism is not an essential part of the optical system and therefore is not described in detail. In a simple embodiment of the invention the device is held in the mount shown merely by friction and is moved by hand. In more elaborate embodiments, electrical drives are provided and servo mechanisms are coupled to indicators or subsequent stages in which the blade is to be mounted for further manufacturing operations.

Figure 11:
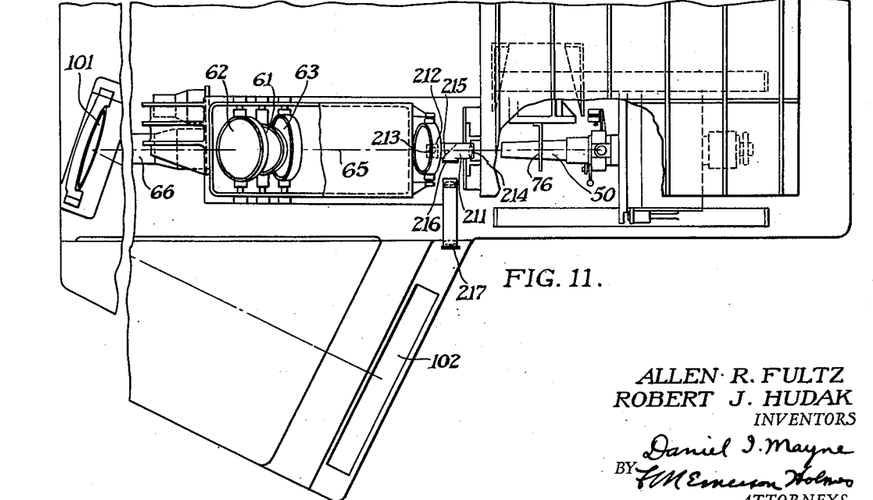
Fig. 11 is a plan view of this embodiment showing details of the image forming system but not of the illuminating system.

Also Fig. 10 shows for the first time the fact that the objective 66 is mounted on a turret so that different magnifications can be selected at will. A mirror 101 receives the light from the objective 66 and reflects it to a screen adjacent to the operator. As shown in Fig. 11 this screen 102 which is the equivalent of the screen 67 of Fig. 7 is mounted at an angle for ease of viewing.

Fig. 11 is a top view showing the relationship between the lens and mirror system 60 to 63 and the mirror 101 and screen 102. To permit a quick check on the orientation of mirrors 76 and 176, which must be held within close tolerances, collimators 211 of the gauss eyepiece type are included, each with a lamp 213, a reticle 212, a semitransparent mirror 215 and a lens 214 to send collimated light to the mirror 76 or 176 and to refocus it after reflection on a second reticle 216, which can conveniently be examined through a telescope 217.

Figure 12:
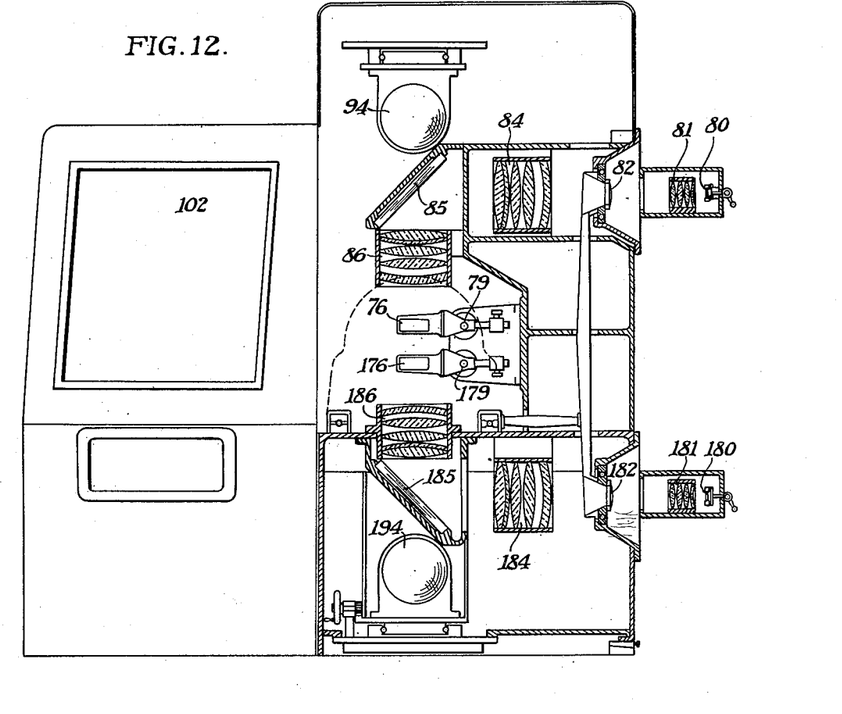
Fig. 12 is an end view showing part of the illuminating system.

Fig. 12 is an end view mainly showing the illuminating system made up of elements 80 to 86 and the corresponding lower system made up of elements 180 to 186 respectively. Lenses 94 and 194 of the other illuminating systems are shown. As shown in this figure the mirrors 76 and 176 are mounted rotatable about pivot 79 and 179 which are off set slightly so that the rotating parts do not interfere with each other. This permits the mirrors 76 and 176 to be full silvered mirrors rather than semitransparent ones. As pointed out above either embodiment has advantages.

Figure 13:
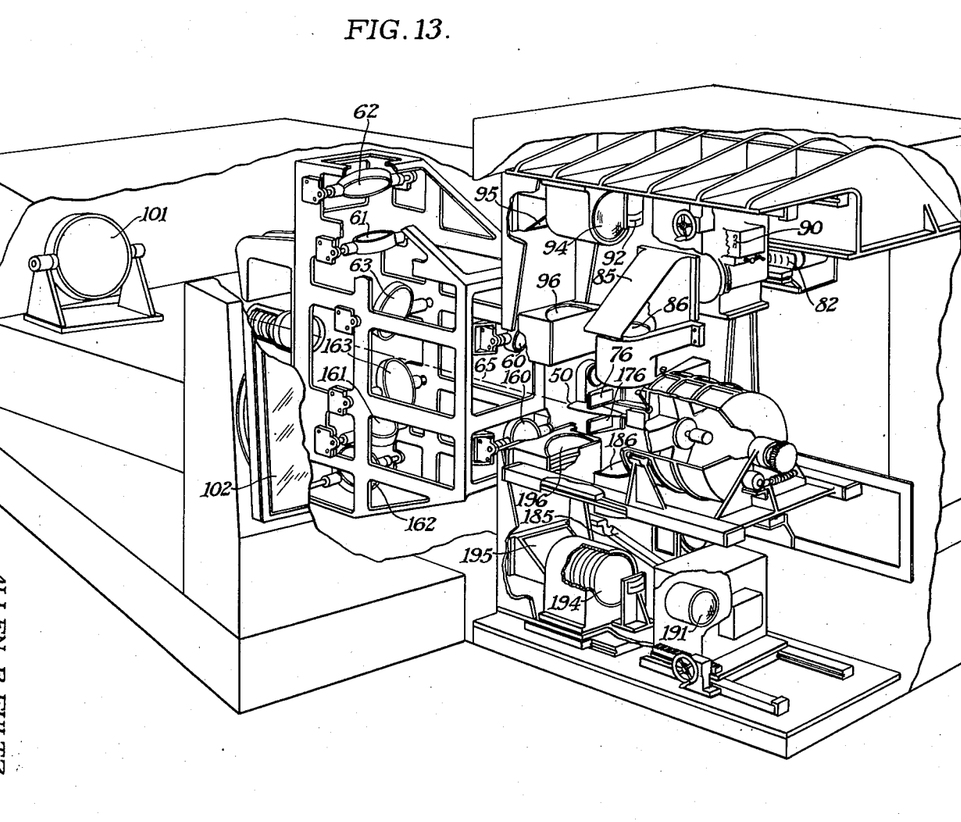
Fig. 13 is a perspective view of the whole optical system with certain details cut away or shown merely in outline to avoid confusion.

Fig. 13 is a perspective view (partly broken away) of all of the component parts of the optical system. No additional features are added in this figure. The coupling between the two illuminating systems so that the mirrors 76 and 176 are maintained half-way between the two sections being illuminated and examined, consists of simple levers which do not appear in this Fig. 13 since they would confuse the drawing. Therefore they are shown in Fig. 14. (On the same sheet as Fig. 8.)

In Fig. 14 the only parts of the optical system shown are the lenses 86, 186, 96 and 196 and the mirrors 76 and 176. The view is from the opposite side to that shown in Fig. 10. The mirrors 76 and 176 are carried by a mount comprising a vertical portion 201 and a horizontal portion 202 which slides between horizontal tracks 204. A gudgeon 203 extending from the side of the mount 202 acts as a pivot for two lever arms 205, the four ends of which contain slots 206 which engage pins 207 on the sides of the condenser lenses. Movement of either of the illuminating systems toward or away from the other system provides a corresponding motion of the point 203 but with only half the extent of movement. Thus the mirrors 76 and 176 are maintained exactly half-way between the illuminating systems.

Figure 15:
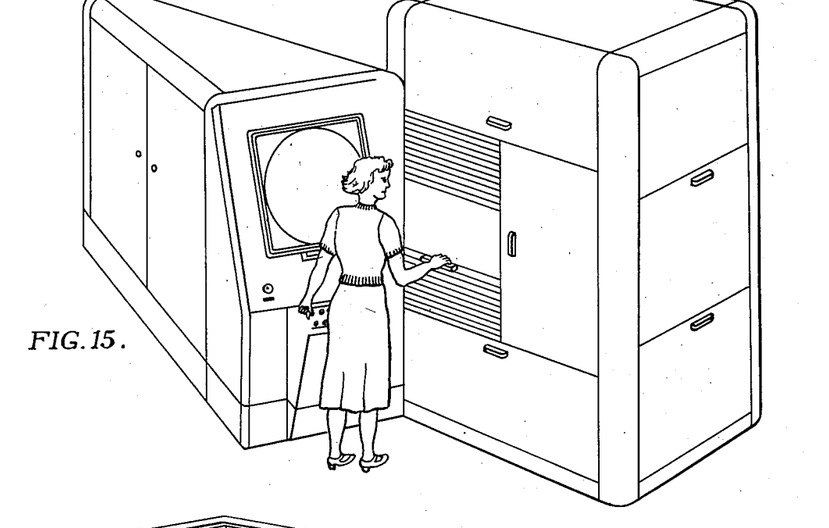
Fig. 15 is a perspective view of the outside of the instrument.

Fig. 15 is merely a perspective view of the outside of the instrument to indicate the overall dimensions thereof.

Our invention is not limited to the specific arrangements shown but is of the scope of the appended claims.

We claim:

1. An optical system for the inspection of the complete profile of a cross section of an object, comprising a plurality of illuminators for illuminating a line around the object at said section from a plurality of directions covering 360°, a plurality of objectives uniformly spaced around the object for receiving light reflected obliquely from said line, with substantially the same obliquity for all of the objectives, and for forming images of parts of said line, and a pair of plane mirrors optically aligned with each of said objectives for reflecting said images into register parallel to, and spaced directly perpendicularly from, said section.

2. An optical system according to claim 1, including a screen and a projection lens for receiving light from the registered images and for relaying them, with magnification, onto said screen.

3. An optical system according to claim 1, in which each of said objectives is afocal consisting of two positive lenses optically separated by the sum of their focal lengths.

4. An optical system according to claim 3, in which at least one of the two mirrors aligned with each objective is optically between the two lenses of the objective.

5. An optical system for the inspection of the complete profile of a cross section of an object, comprising two illuminating systems on opposite sides of the object for illuminating a line around the object at said section, two objectives on the same opposite sides of the object for receiving light reflected obliquely from said line, with the same obliquity for both objectives and for forming images of the corresponding opposite parts of said line and a pair of plane mirrors, optically aligned with each of said objectives, for reflecting said images into register parallel to, and spaced directly perpendicularly from, said section.

6. An optical system according to claim 5 in which the illuminating systems include positive lenses wider than said section of the object forming converging beams of light on said opposite sides of the object with the two beams thus formed overlapping each other around the object.

7. An optical system according to claim 5 in which each of the illuminating systems includes an illuminated slit and an objective for receiving light from the slit and focusing an image thereof on the object.

8. An optical system according to claim 7 in which said illuminated slit is curved to be conjugate to the side of the object illuminated by the image of said slit.

9. An optical system according to claim 5 in which each illuminating system includes an illuminated slit and an afocal objective consisting of two positive lenses separated by the sum of their focal lengths for receiving light from the illuminated slit and forming an image thereof on the side of the object.

10. An optical system according to claim 9 in which the slit is the same shape as the side of the object and is precisely conjugate thereto.

11. An optical system according to claim 5, including a screen and a projection lens for receiving light from the registered images and for relaying them, with magnification, onto said screen.

12. An optical system according to claim 5, in which each of said objectives is afocal consisting of two positive lenses optically separated by the sum of their focal lengths.

13. An optical system according to claim 12, in which at least one of the two mirrors aligned with each objective is optically between the two lenses of the objective.

14. An optical system for the simultaneous inspection of the complete profiles of two parallel cross sections of an object, comprising four illuminating systems, two on opposite sides of the object for illuminating a line around the object at one of said sections and the other two on the same opposite sides of the object for illuminating a line around the object at the other of said sections, two objectives also on the same opposite sides of the object for receiving light reflected obliquely from one of said lines past the other of said lines, with the same obliquity for both objectives and for forming images of the corresponding opposite parts of said line, a semitransparent reflecting surface parallel to said sections and half-way between them for reflecting light from said other of said lines into alignment with the direction the light goes to each of the objectives for forming images of opposite parts of the second of said lines superimposed on the plane of the first mentioned images, and a pair of plane mirrors, optically aligned with each of said objectives, for reflecting each pair of superimposed images into register with the other pair, parallel to, and spaced perpendicularly from, said sections.

15. An optical system according to claim 14 in which the distance between the two sections is adjustable, the illuminating systems are adjustable accordingly, and which includes means for adjusting said systems and semitransparent reflecting means in each object beam parallel to itself to maintain the reflecting means half-way between the sections.

16. An optical system according to claim 14, including a screen and a projection lens for receiving light from the registered images and for relaying them, with magnification, onto said screen.

17. An optical system according to claim 14, in which each of said objectives is afocal consisting of two positive lenses optically separated by the sum of their focal lengths.

18. An optical system according to claim 17, in which at least one of the two mirrors aligned with each objective is optically between the two lenses of the objective.

ALLEN R. FULTZ.
ROBERT J. HUDAK.

REFERENCES CITED

The following references are of record in the file of this patent:

UNITED STATES PATENTS

| Number | Name | Date |
|---|---|---|
| 2,066,996 | Morioka | Jan. 5, 1937 |
| 2,163,124 | Jeffreys | June 20, 1939 |
| 2,256,102 | Reason | Sept. 16, 1941 |
| 2,302,572 | Reason | Nov. 17, 1942 |
| 2,349,989 | Reason | May 30, 1944 |
| 2,500,051 | Wolff | Mar. 7, 1950 |